United States Patent

Ito et al.

Patent Number: 5,967,621
Date of Patent: Oct. 19, 1999

[54] BRAKE SYSTEM FOR AN ELECTRIC VEHICLE

[75] Inventors: Hisahiro Ito; Tomoyuki Itoh; Shinji Yoshikawa; Yasushi Aoki, all of Wako, Japan

[73] Assignee: Honda Giken Kogyo Kabushiki Kaisha, Tokyo, Japan

[21] Appl. No.: 08/856,535

[22] Filed: May 14, 1997

[30] Foreign Application Priority Data

May 15, 1996 [JP] Japan .................................... 8-120036

[51] Int. Cl.⁶ ...................................................... B60T 7/00
[52] U.S. Cl. .................................. 303/15; 303/3; 303/152
[58] Field of Search ................................. 303/152, 20, 3, 303/15; 188/156, 106 P; 180/165

[56] References Cited

U.S. PATENT DOCUMENTS

| 5,378,053 | 1/1995 | Patient et al. ........................ 303/152 X |
| 5,433,512 | 7/1995 | Aoki et al. ............................... 303/152 |
| 5,511,859 | 4/1996 | Kade et al. .............................. 303/152 |

FOREIGN PATENT DOCUMENTS 6-153315  5/1994  Japan .

*Primary Examiner*—Robert J. Oberleitner
*Assistant Examiner*—Mariano Sy
*Attorney, Agent, or Firm*—Nikaido, Marmelstein, Murray & Oram LLP

[57] ABSTRACT

In an electric vehicle in which regenerative braking is performed in preference to hydraulic braking, an uncomfortable vibration generated due to a sudden variation in the load of a motor, is prevented at the start of the regenerative braking. At the start of the braking, the regenerative braking force is gradually increased from a previously set regenerative initial value to a demanded braking force rather than being increased quickly to the demanded braking force, thereby preventing the generation of the vibration. A deficiency in the braking force during this time is compensated for with the hydraulic braking force. When the demanded braking force exceeds a regenerative acceptable value, the regenerative braking force does not exceed the acceptable value, and a deficiency of braking force thereafter is compensated for with the hydraulic braking force.

5 Claims, 5 Drawing Sheets

5,967,621

BRAKE SYSTEM FOR AN ELECTRIC VEHICLE

BACKGROUND OF THE INVENTION

1. Field of the Invention

The present invention relates to a brake system for an electric vehicle including driven wheels connected to and driven by a motor and braked in a regenerative and mechanical manner in response to an operation of a brake operating element.

2. Description of the Prior Art

A brake system for an electric vehicle is known from Japanese Patent Application Laid-open No. 6-153315, in which a kinetic energy of a vehicle body lost by braking, can be effectively recovered as an electric energy by performing a regenerative braking to enhance electric power consumption, in preference to hydraulic braking during braking and by compensating, with the hydraulic braking, a deficiency in braking force resulting from using only the regenerative braking.

When braking torque is generated in a motor which generates a driving torque in an electric vehicle, thereby performing a regenerative braking, a problem is encountered in that the driving system between the motor and driven wheels resonates to generate an uncomfortable vibration.

SUMMARY OF THE INVENTION

The present invention has been accomplished with the above circumstance in view, and it is an object of the present invention to prevent the uncomfortable vibration generated at the start of regenerative braking.

To achieve the above object, a brake system for an electric vehicle includes driven wheels connected to and driven by a motor and braked in a regenerative and mechanical manner in response to the operation of a brake operating element. The brake system comprises a brake-operation magnitude detecting means, for detecting the magnitude of operation of the brake operating element and a demanded braking force determining means for determining a demanded braking force based on the brake operation magnitude. A braking force distributing means distributes the demanded braking force between a regenerative braking force and a mechanical braking force at a predetermined ratio, and a braking force distribution regulating means regulates the distribution ratio determined by the braking force distributing means at an initial stage of the braking operation, so that the distribution proportion of the mechanical braking force is increased.

According to another feature of the present invention, the braking force distribution regulating means gradually increases the regenerative braking force from a predetermined initial value to the distribution proportion determined by the braking force distributing means, at the initial stage of the braking operation.

DETAILED DESCRIPTION OF THE PREFERRED EMBODIMENT

Figure 1:
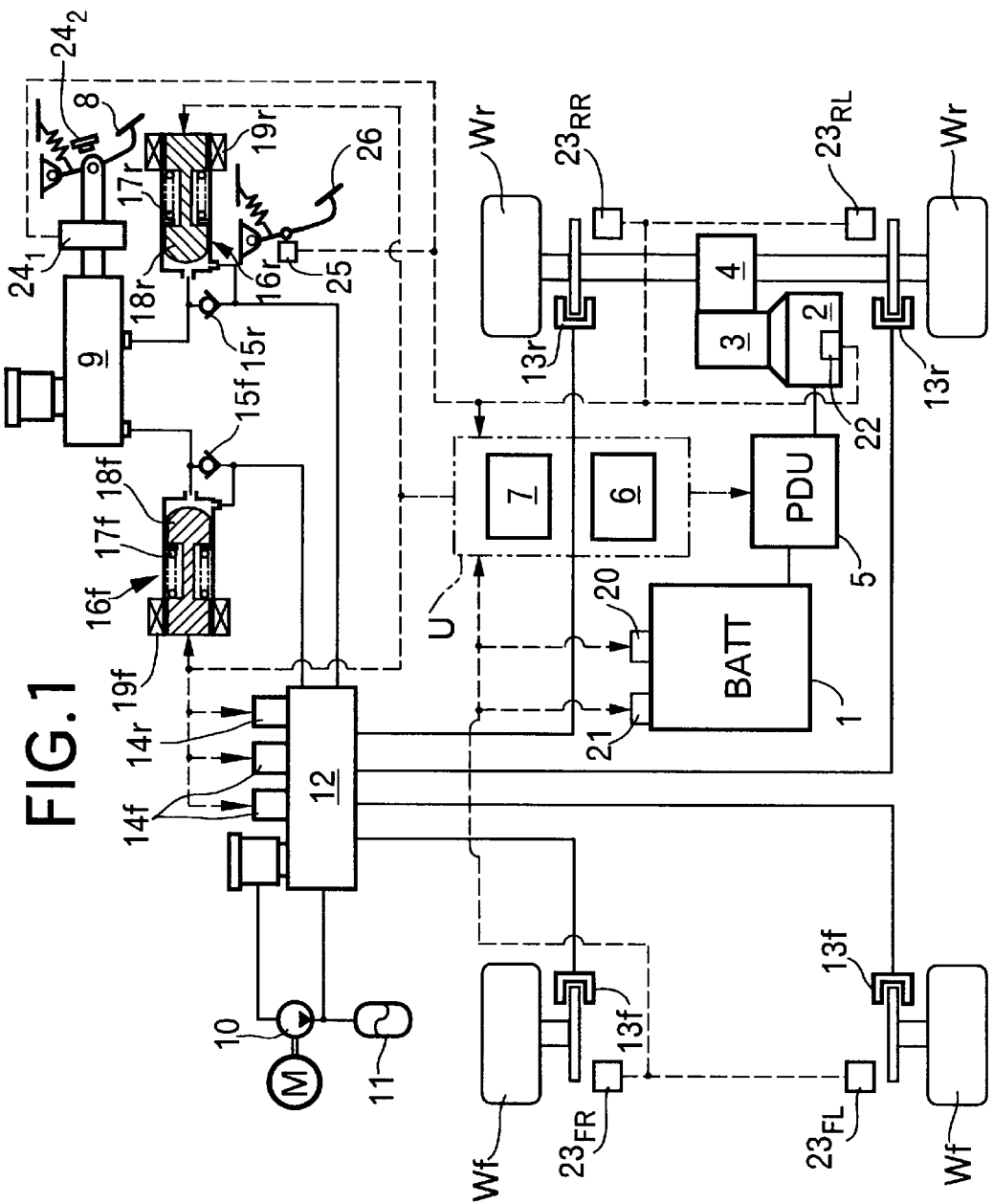
FIG. 1 is a diagrammatic illustration of the entire arrangement of a brake system for an electric vehicle.

As shown in FIG. 1, the electric vehicle is a four-wheel vehicle including a pair of front wheels Wf, Wf as follower wheels, and a pair of rear wheels Wr, Wr as driven wheels. The rear wheels Wr, Wr are connected to an electric motor 2 driven by a battery 1 serving as an energy source through a transmission 3 having four (4) forward stages and a differential 4. A PDU (power drive unit) 5 is connected between the battery 1 and the motor 2 to control the driving of the motor 2 by the battery 1 and to control the charging of the battery 1 by electric power generated by the motor 2 during regenerative braking. The PDU 5 and the transmission 3 are connected to a motor control means 6 of the electronic control unit U. The motor control means 6 is connected to a brake control means 7 of the electronic control unit U.

A master cylinder 9 operated by a brake pedal 8, is connected to brake cylinders 13$f$, 13$f$ for the front wheels Wf, Wf and brake cylinders 13$r$, 13$r$ for the rear wheels Wr, Wr through a modulator 12 connected to an accumulator 11, in which hydraulic pressure is accumulated by a hydraulic pressure pump 10. The modulator 12 includes an ABS (antilock brake system) control valve 14$f$ of a 2-channel type for the front wheels, and an ABS control valve 14$r$ of a 1-channel type for the rear wheels, so that when a locking tendency is produced in the front wheels Wf, wr and the rear wheels Wr, Wr, the hydraulic braking pressure transmitted to the brake cylinders 13$f$, 13$f$; 13$r$, 13$r$ thereof is reduced.

A hydraulic pressure control valve 16$f$ for controlling the hydraulic braking pressure transmitted to the brake cylinders 13$f$, 13$f$ for the front wheels Wf, Wf and a hydraulic pressure control valve 16$r$ for controlling the hydraulic braking pressure transmitted to the brake cylinders 13$r$, 13$r$ for the rear wheels Wr, Wr are connected in an oil passage which interconnects the master cylinder 9 and the modulator 12.

The hydraulic pressure control valve 16$f$ for the front wheels includes a valve member 18$f$ biased in an opening direction by a spring 17$f$, and a linear solenoid 19$f$ having its duty ratio controlled to bias the valve member 18$f$. Therefore, if the linear solenoid 19$f$ is deenergized, the hydraulic pressure control valve 16$f$ is opened to permit the hydraulic braking pressure generated by the master cylinder 9 to be transmitted to the modulator 12. By energizing the linear solenoid 19$f$ at a predetermined duty ratio, the hydraulic braking pressure transmitted from the master cylinder 9 to the modulator 12 may be regulated to any pressure. The hydraulic pressure control valve 16$r$ for the rear wheels has the same structure as that for the front wheels.

One-way valves 15$f$ and 15$r$ are provided in parallel in the hydraulic pressure control valves 16$f$ and 16$r$ for limiting the transmission of the hydraulic pressure from the master cylinder 9 to the modulator 12 and permitting the transmission of the hydraulic pressure from the modulator 12 to the master cylinder 9.

Figure 2:
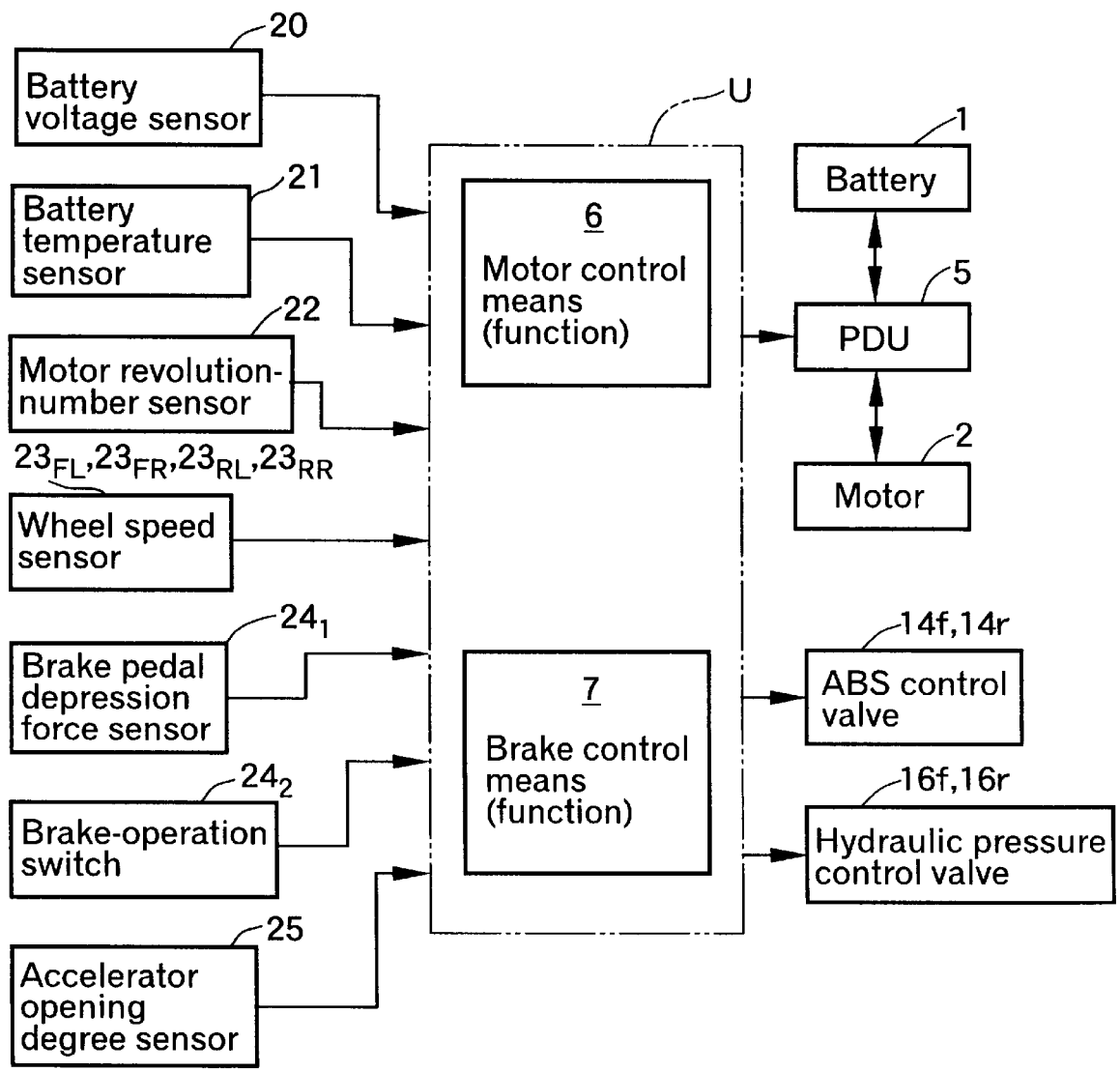
FIG. 2 is a block diagram of the control section of the present invention.

As can be seen from FIG. 2 in addition to FIG. 1, a battery voltage sensor 20 and a battery temperature sensor 21 mounted on the battery 1, a motor revolution speed sensor 22 for detecting a number of revolutions per minute of the motor 2, wheel speed sensors 23$_{FL}$, 23$_{FR}$, 23$_{RL}$ and 23$_{RR}$ mounted on the front and rear wheels Wf, Wf and Wr, Wr, brake pedal depression-force sensor 24, and a brake-operation switch 24$_2$ mounted on the brake pedal 8, and an accelerator opening degree sensor 25 mounted on an accelerator pedal 26 are all connected to the electronic control unit U. In addition, connected to the electronic control unit U are the hydraulic pressure valves 16f and 16r which are controlled based on output signals from these sensors, the ABS control valves 14f and 14r, and the PDU 5 for controlling the battery 1 and the motor 2.

Figure 3:
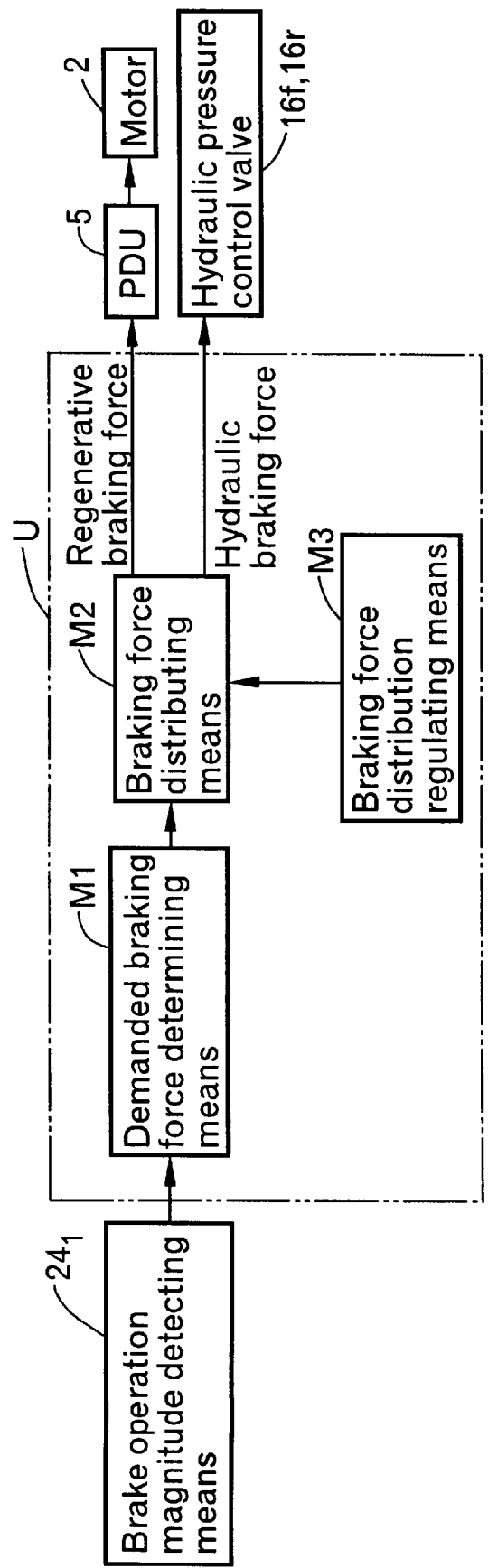
FIG. 3 is a block diagram illustrating the circuit arrangement of an electronic control unit of the present invention.

As shown in FIG. 3, the electronic control unit U includes a demanded-braking force determining means M1 for determining the braking force demanded by a driver based on the output from the brake pedal depression force sensor (a brake-operation magnitude detecting means) $24_1$. A braking force distributing means M2 distributes the demanded braking force determined by the demanded-braking force determining means Ml, to the regenerative braking force generated by the motor 2 and the hydraulic braking force (a mechanical braking forces) generated by the brake cylinders 13f, 13f; 13r, 13r, at a predetermined ratio, and a braking-force distribution regulating means M3 regulates the ratio of distribution of the regenerative braking force and the hydraulic braking force. The ratio is determined by the braking force distributing means M2 at an initial stage of braking immediately after depression of the brake pedal 8, to temporarily increase the proportion of the hydraulic braking force. Thus, the motor 2 is controlled through the PDU 5 based on a regenerative braking magnitude outputted by the braking force distributing means M2, and the hydraulic pressure control valves 16f and 16r are controlled based on the hydraulic braking magnitude outputted by the braking force distributing means M2.

Figure 4:
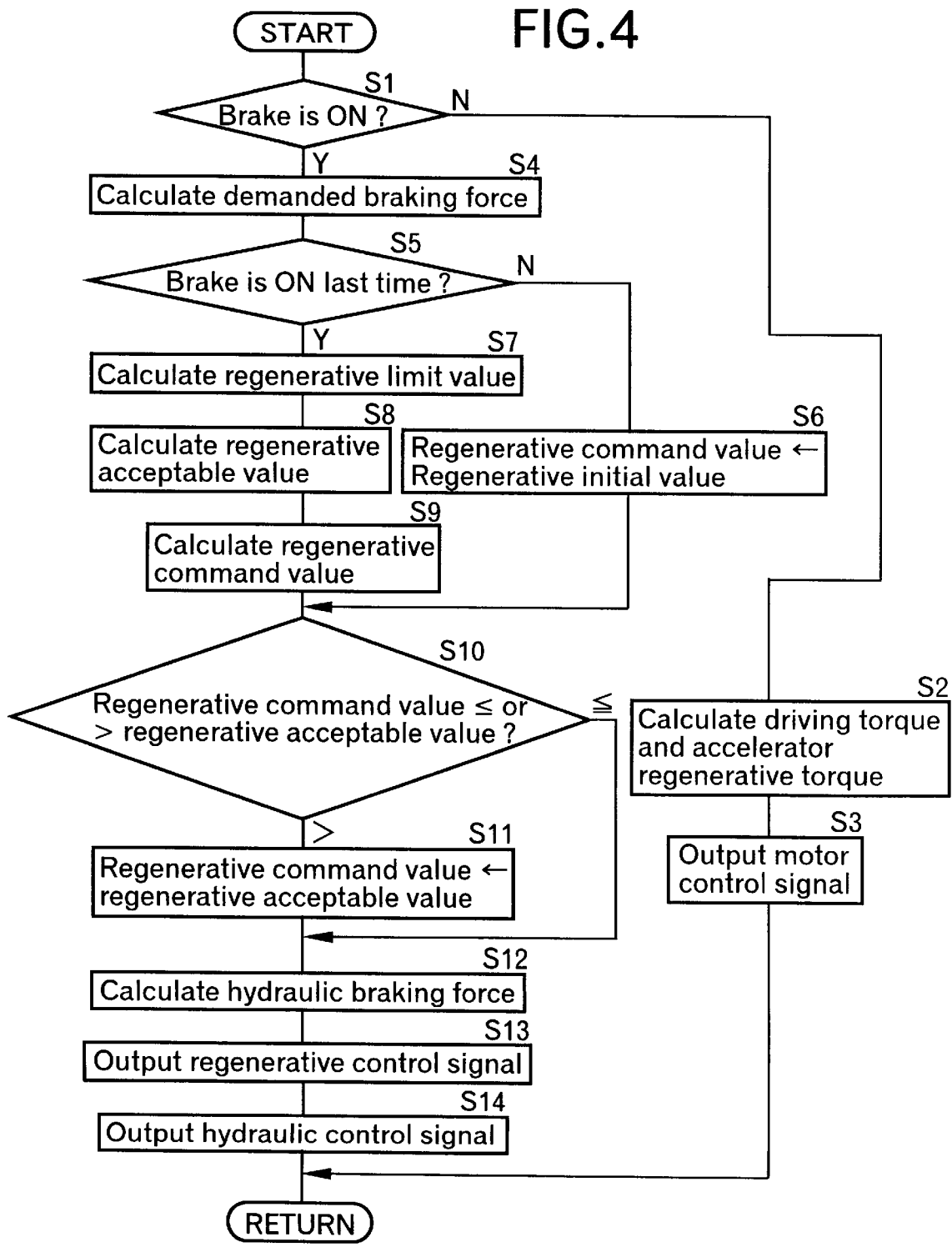
FIG. 4 is a flow chart for explaining the operation of the present invention.

The operation of the embodiment of the present invention having the above-described arrangement will be described with reference to a flow chart shown in FIG. 4.

First, if the driver is not depressing the brake pedal 8 at step S1 and hence, the brake-operation switch $24_2$ is OFF, a driving torque or an accelerator regenerative torque (a torque for generating a braking force corresponding to an engine brake in a gasoline vehicle) to be generated in the motor 2 is calculated at step S2. A control signal for the motor 2 is outputted at step S3 to generate the driving torque or the accelerator regenerative torque. The driving torque or the accelerator regenerative torque is determined, for example, by a map search, based on the motor revolution speed Nm outputted by the motor revolution speed sensor 22 and the accelerator opening degree outputted by the accelerator opening degree sensor 25.

If the driver depresses the brake pedal 8 at step S1 to turn ON the brake-operation switch $24_2$, a demanded braking force corresponding to a total braking force demanded by the driver is calculated based on an output from the brake pedal depression force sensor 24, at step S4. If the answer at subsequent step S5 is NO and the brake-operation switch $24_2$ is turned ON for the first time in a current loop, the processing is advanced to step S6, at which a previously set regenerative initial value is employed as a regenerative command value for commanding the magnitude of a regenerative braking force to be generated in the motor 2. The regenerative initial value is set at a value at which vibration of the driving system between the motor 2 and the rear wheels Wr, Wr which are the driven wheels, is not generated at the initial stage of braking.

On the other hand, in next and subsequent loops in which the brake-operation switch $24_2$ has been turned ON, the answer at step S5 is YES, progressing to step S7, at which a regenerative limit value is calculated. If a back electromotive force generated by the motor 2 due to regenerative braking, is too large, the battery 1 and the PDU 5 may be damaged. For this reason, the regenerative braking force generated by the motor 2 is controlled so as not to exceed the regenerative limit value. The regenerative limit value is basically map-searched based on the motor revolution speed detected by the motor revolution speed sensor 22, and is determined by correcting the map value as a function of the battery voltage, detected by the battery voltage sensor 20 and the battery temperature, detected by the battery temperature sensor 21.

At subsequent step S8, a regenerative acceptable value corresponding to a net regenerative braking force capable of being produced by the motor 2, is calculated by subtracting the accelerator regenerative magnitude determined at step S2 from the regenerative limit value determined at step S7. Then, at step S9, a value resulting from the addition of a previously-set predetermined increment to the regenerative command value in the last loop is defined as a new regenerative command value. Therefore, in the first loop in which the brake-operation switch SW has been turned ON, the regenerative command value is set at a regenerative initial value, and in every subsequent loop, the regenerative command value is linearly increased by the predetermined increment.

If the regenerative command value is determined at step S6 or S9 in the above manner, such regenerative command value is compared, at step S10, with the regenerative acceptable value determined at step S8. If the regenerative command value is equal to or smaller than the regenerative acceptable value, the processing is advanced directly to step S12. If the regenerative command value is larger than the regenerative acceptable value, the regenerative command value is limited by the regenerative acceptable value at step S11 to prevent damaging of the battery 1 or the PDU 5, progressing to step S12.

At step S12, a hydraulic braking force is calculated by subtracting the regenerative command value from the demanded braking force calculated at step S4. Then, at step S13, a regenerative control signal which is a sum of the brake regenerative magnitude and the accelerator regenerative magnitude is outputted to the PDU 5, so that a regenerative braking force corresponding to the regenerative command value is obtained. At step S14, a hydraulic control signal is outputted to the linear solenoids 19f, 19r (see FIG. 1) of the hydraulic pressure control valves 16f, 16r, so that the hydraulic braking force is generated. As a result, the braking hydraulic pressure transmitted from the master cylinder 9 to the brake cylinders 13f, 13f; 13r, 13r is controlled to a predetermined value, to generate a hydraulic braking force having the same magnitude as that determined at step S12.

Figure 5:
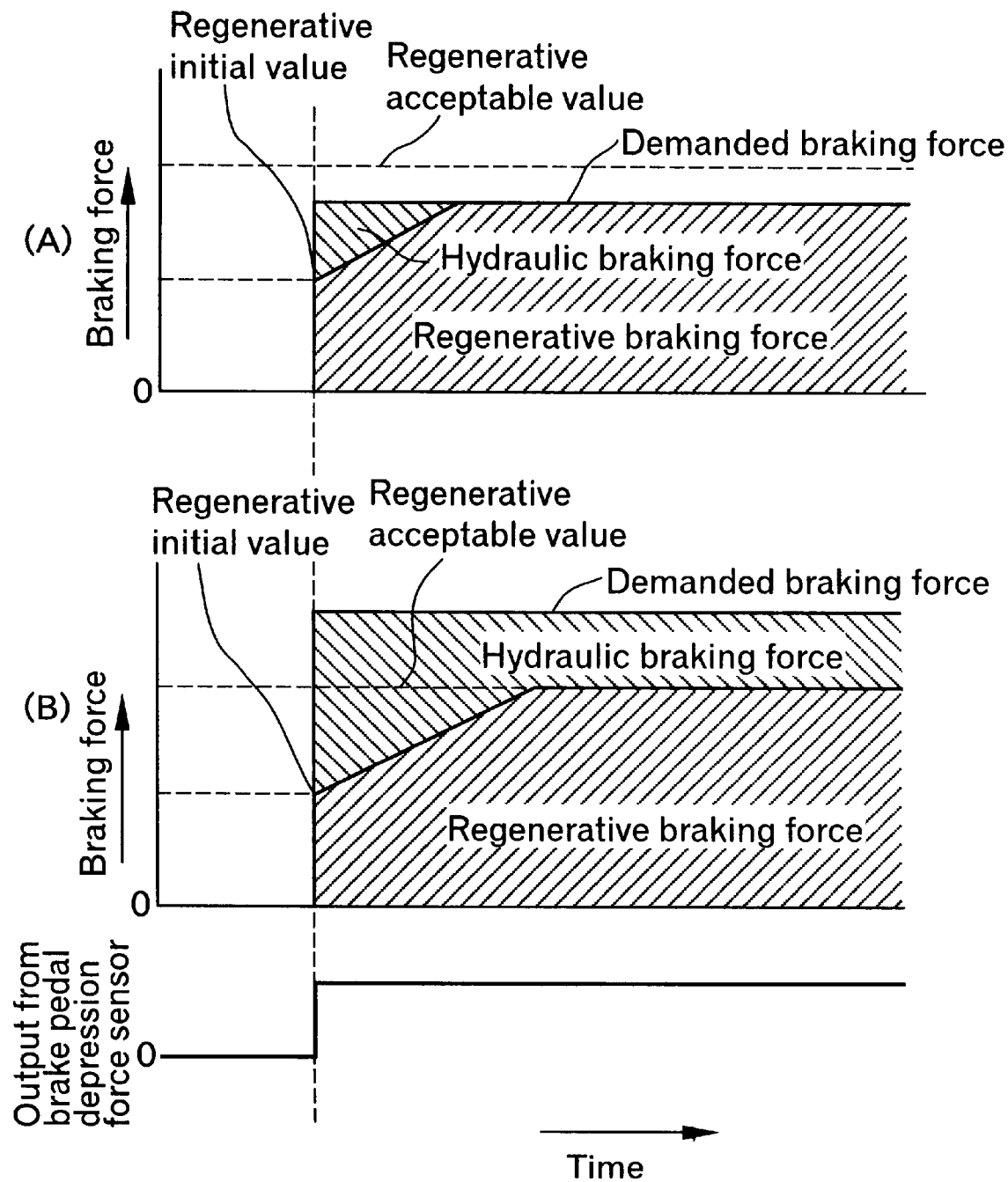
FIG. 5 is a time chart for explaining the operation of the present invention.

The above-described operation will be further described with reference to a time chart shown in FIG. 5.

FIG. 5A illustrates the operation when the demanded braking force is smaller than the regenerative acceptable value. The regenerative braking force at the moment when the brake pedal 8 is depressed to turn ON the brake-operation switch $24_2$, is set at the regenerative initial value, and a braking force corresponding to a difference between the demanded braking force and the initial regenerative braking force is provided by the hydraulic braking force. The regenerative braking force is increased of a predetermined increment from the regenerative initial value, in every loop, and in accordance with this increase, the hydraulic braking force is gradually decreased. If the regenerative braking force reaches the demanded braking force in a short time, the hydraulic braking force becomes zero at that time. If the demanded braking force is equal to or smaller than the regenerative initial value, the entire amount of the demanded braking force is provided from the beginning, by the regenerative braking force, and no hydraulic braking force is generated.

FIG. 5B illustrates the operation when the demanded braking force is equal to or larger than the regenerative acceptable value. In this case, at the moment when the brake-operation switch 242 is turned ON, the regenerative braking force is gradually increased from the regenerative initial value, and the hydraulic braking force providing the difference between the demanded braking force and the regenerative braking force is gradually decreased. After the regenerative braking force reaches the regenerative acceptable value, the increasing of the regenerative braking force is completed, whereby the regenerative braking force is maintained at the regenerative acceptable value, and in response to this, the decreasing of the hydraulic braking force ends.

By using the regenerative braking force in preference to the hydraulic braking force during braking, and by compensating for the deficiency of the regenerative braking force by using the hydraulic braking force, as described above, the kinetic energy of the vehicle body lost by the braking can be effectively recovered as electric energy, to enhance electric power consumption, while ensuring a required total braking force. In addition, since the regenerative braking force is suppressed to the regenerative initial value in the state of initial braking, a variation amount, when the torque of the motor 2 is changed from the driving torque to the braking torque before and after the start of the braking, can be decreased, and the uncomfortable vibration of the vehicle due to the vibration of the driving system between the motor 2 and the rear wheels Wr, Wr, can be effectively inhibited. Moreover, if a predetermined time has lapsed from the start of braking, the regenerative braking force is increased up to the demanded braking force (or the regenerative acceptable value) and hence, the loss of the recovered amount of electric energy can be kept to the minimum.

For example, the regenerative command value is increased linearly with respect to the rise of the demanded braking force in the embodiment, but the regenerative braking force can be increased smoothly from the regenerative initial value toward the demanded regenerative amount by determining a regenerative command value according to a primary retarding process. In this case, the regenerative command value is calculated according to the following equation:

Regenerative command value=last regenerative command value×k+demanded regenerative amount×(1−k)

where k is a constant of 0<k<1.

The uncomfortable vibration at the start of the regenerative braking, is significant when the amount of variation in torque of the motor 2 is large. When the braking torque is generated in the motor 2 by depressing the brake pedal 8 from a state in which the motor 2 generates no driving torque (in an accelerator regenerative state in which the driver's foot has been released from the accelerator pedal 26), the amount of variation in torque is relatively small, as compared with the case where the brake pedal 8 has been depressed immediately after releasing of the accelerator pedal 26 and hence, the above-described vibration is slightly generated. Therefore, when the brake pedal 8 is depressed from the accelerator regenerative state to start the brake regenerative operation, the control for suppressing the regenerative braking force can be prohibited.

Further, a vehicle having the front wheels Wf, Wf as the follower wheels and the rear wheels Wr, Wr as the driven wheels is illustrated in the embodiment, but the present invention is applicable to a vehicle having front wheels Wf, Wf as driven wheels and rear wheels Wr, Wr as follower wheels. Still further, braking by a brake cable can be employed in place of the hydraulic braking.

As discussed above, the distribution ratio determined by the braking force distributing means is regulated, so that the distribution proportion of the mechanical braking force is increased at the initial stage of the braking operation. Therefore, it is possible to suppress a sudden increase in the regenerative braking force at the start of braking and thereby inhibit the uncomfortable vibration of the vehicle body due to the vibration of the driving system between the motor and the rear wheels.

Further, the braking force distribution regulating means gradually increases the regenerative braking force from the predetermined initial value to the distribution proportion determined by said braking force distributing means at the initial stage of the braking operation. Therefore, it is possible to suppress the loss of the recovered amount of the electric energy, due to increasing the distribution proportion of the mechanical braking force.

Although the embodiment of the present invention has been described in detail, it will be understood that the present invention is not limited to the above-described embodiment, and various modifications in design may be made without departing from the spirit and scope of the invention defined in claims.

What is claimed is:

1. A brake system for an electric vehicle having driven wheels, a motor connected to said driven wheels, wherein said motor drives said driven wheels and provides regenerative braking to said driven wheels, and a mechanical brake assembly for providing mechanical braking to said driven wheels, said brake system comprising:

(a) a brake operating element;

(b) a brake operation magnitude detecting means for detecting the magnitude of operation of said brake operating element;

(c) demanded brake force determining means for determining a demanded braking force based upon the brake force operation magnitude;

(d) brake force distributing means for distributing the demanded brake force as a regenerative brake force and as a mechanical brake force in a predetermined distribution ratio; and (e) brake force distribution regulating means for regulating the distribution ratio determined by said brake force distributing means at an initial stage of braking operation, such that until a predetermined period of time elapses from an instant when said brake operating element is operated, a distribution proportion between said regenerative brake force and said mechanical brake force is modulated to increase said mechanical brake force by a predetermined amount and to decrease said regenerative brake force by said predetermined amount; and after said predetermined period of time has elapsed from said instant when said brake operating element is operated, said distribution proportion between said regenerative brake force and said mechanical brake force is returned to said predetermined distribution ratio determined by said brake force distributing means.

2. A brake system as set forth in claim 1, wherein said brake force distribution regulating means gradually increases the regenerative brake force from a predetermined initial value to the distribution ratio determined by said brake force distributing means in the course of passage of said predetermined period of time.

3. A brake system as set forth in claim 1 wherein said brake force distributing means includes means for determining a maximum regenerative brake force as a function of motor revolution speed and wherein when said regenerative brake force is at the maximum value, if any additional brake force is required, the additional brake force is a mechanical brake force.

4. A brake system as set forth in claim 3 wherein said means for determining the maximum regenerative brake force is a MAP.

5. A brake system as set forth in claim 1, wherein said brake force distribution regulating means regulates said distribution ratio so as to decrease said regenerative brake force by said predetermined amount until said predetermined period of time elapses, even when said demanded braking force is lower than a regenerative acceptable value which corresponds to a regenerative brake force that can be produced by said motor.

\* \* \* \* \*